United States Patent Office

3,538,102
Patented Nov. 3, 1970

3,538,102
PROCESS FOR THE PREPARATION OF (—)-NORSCOPOLAMINE
Rolf Banholzer, Werner Schulz, and Karl Zeile, Ingelheim am Rhein, Germany, assignors to Boehringer Ingelheim G.m.b.H., Ingelheim am Rhein, Germany, a corporation of Germany
No Drawing. Filed Mar. 10, 1969, Ser. No. 805,830
Claims priority, application Austria, Mar. 12, 1968,
A 2,439/68
Int. Cl. C07d 43/06
U.S. Cl. 260—292
3 Claims

ABSTRACT OF THE DISCLOSURE

A process for the preparation of (—)-norscopolamine or a salt thereof from (—)-scopolamine or a salt thereof, which comprises demethylating (—)-scopolamine or a salt thereof in aqueous solution at a pH of 6 to 9 and a temperature of 0 to 60° C. with an alkali metal permanganate.

This invention relates to a novel method of preparing (—)-norscopolamine by oxidative demethylation of (—)-scopolamine.

THE PRIOR ART

It is well known that (—)-scopolamine can be oxidatively demethylated with potassium permanganate, provided the primary alcoholoic hydroxyl group of the tropic acid moiety is protected, for instance, by acetylation, during the oxidative demethylation [see H. L. Schmidt et al., Liebigs Annalen 688 (1965), page 228]. These authors state that the intermediate protection of the hydroxyl group is essential.

THE INVENTION

We have discovered that, contrary to expectation, it is indeed possible to prepare (—)-norscopolamine by oxidative demethylation of (—)-scopolamine without protection of the primary alcoholic hydroxyl group of the tropic acid moiety, provided certain reaction conditions are maintained.

More particularly, we have discovered that (—)-norscopolamine is obtained by subjecting (—)-scopolamine or a salt thereof, such as the sulfate or hydrobromide, to oxidative demethylation with a permanganate, such as potassium permanganate, in aqueous solution at a temperature between about 0 and 60° C., preferably 20 to 40° C., and at a pH of about 6 to 9, preferably 6 to 7.5.

The demethylation reaction proceeds most efficiently within the indicated preferred temperature range of about 20 to 40° C.; at higher temperatures, i.e. between 40 and 60° C., undesirable side reactions often occur.

Likewise, the demethylation reaction proceeds most efficiently within the indicated preferred pH range. If the pH of the reaction mixture is allowed to rise above 9, hydrolysis occurs to an increasing degree, whereas if (—)-scopolamine hydrobromide is used as the starting material, for example, the undesirable oxidation of bromine anions to free bromine may occur at pH values below 6. Moreover, the oxidation potential increases with decreasing pH values, so that under these conditions the oxidative attack upon the hydroxyl group of the tropic acid moiety is favored.

The reaction may, in principle, also be carried out in an organic solvent which is inert toward oxidation under the reaction conditions, such as acetone. However, the aqueous reaction medium is preferred because it makes it easier to maintain the pH-value constant and produces better yields of the desired end product.

The oxidizing agent is provided in an amount corresponding to the calculated stoichiometric amount or in slight excess thereover.

If desired, the free base (—)-norscopolamine obtained as the initial reaction product may be converted into an acid addition salt thereof in customary fashion, for instance, by dissolving the free base in an inert solvent and acidifying the solution with the desired acid. Examples of non-toxic, pharmacologically acceptable acid addition salts of (—)-norscopolamine are those formed with hydrochloric acid, hydrobromic acid, sulfuric acid, phosphoric acid, acetic acid, maleic acid, tartaric acid, citric acid, 8-chlorotheophylline and the like.

The following example further illustrates the present invention and will enable others skilled in the art to understand it more completely. It should be understood, however, that the invention is not limited solely to the particular example given below.

EXAMPLE 1

A solution of 43.8 gm. (0.1 mol) of (—)-scopolamine hydrobromide·3H$_2$O in 350 cc. of water was adjusted to a pH of 7 (pH-meter) with sodium carbonate, and was then warmed to 30° C. Thereafter, while maintaining the temperature constant at 30° C. and the pH constant at 7 (by dropwise addition of 1 N sulfuric acid as needed), a solution of 37.9 gm. (0.24 mol) of potassium permanganate in 500 cc. of water was stirred into the scopolamine hydrobromide solution over a period of one hour. Thereafter, the reaction mixture was stirred for one hour more under the above temperature and pH conditions, and then the precipitated manganese dioxide was separated by vacuum filtration and washed with water. The filtrate was made alkaline with sodium carbonate and was then extracted with methylene chloride. The organic phase was dried with sodium sulfate, and the methylene chloride was distilled off, leaving 27.8 gm. of crystalline (—)-norscopolamine.

(—)-norscopolamine hydrochloride was obtained by acidifying a solution of (—)-norscopolamine with hydrogen chloride. Recrystallized from methanol-ether, the hydrochloride was obtained in the form of white crystals, M.P. 219° C. (decomp.), specific rotation $$[\alpha]_{20}{}^D = -32.2°$$

(c.=2.0; water). The yield was 25.2 gm. (77.3% of theory).

(—)-norscopolamine as well as its non-toxic, pharmacologically acceptable acid addition salts have useful pharmacodynamic properties; more particularly, they exhibit spasmolytic and sedative activities in experimental animals such as rats and mice.

The acute toxicity of (—)-norscopolamine and its non-toxic acid addition salts is very low; thus, in the mouse the subcutaneous LD$_{50}$ is 350 mgm./kg. and the peroral LD$_{50}$ is 3850 mgm./kg., and in the rat the peroral LD$_{50}$ is 3200 mgm./kg.

(—)-norscopolamine and its salts are also useful as intermediates for the preparation of therapeutically useful N-substituted (—)-norscopolamines.

For pharmaceutical purposes (—)-norscopolamine and its non-toxic salts are administered to experimental animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of (—)-norscopolamine or a non-toxic salt thereof is from 0.0166 to 0.84 mgm./kg. body weight, preferably 0.083 to 0.25 mgm./kg. body weight.

The following examples illustrate a few dosage unit compositions comprising a non-toxic salt of (—)-norscopolamine as an active ingredient. The parts are parts by weight unless otherwise specified.

EXAMPLE 2

Tablets

The tablet composition was compounded from the following ingredients:

| | Parts |
|---|---|
| (—)-norscopolamine hydrochloride | 5.0 |
| Lactose | 35.4 |
| Corn starch | 33.0 |
| Colloidal silicic acid | 5.6 |
| Polyvinylpyrrolidone | 0.6 |
| Magnesium stearate | 0.4 |
| Total | 80.0 |

Compounding procedure

The norscopolamine salt was thoroughly and carefully admixed with a portion of the corn starch, silicic acid and lactose, the mixture was moistened with an ethanolic 5% solution of the polyvinylpyrrolidone, and the moist mass was granulated. The dried granulate was admixed with the remaining ingredients, and the mixture was compressed into 80 mgm.-tablets. Each tablet contained 5 mgm. of the norscopolamine salt and, when administered perorally to an experimental animal of about 60 kg. body weight in need of such treatment, produced very good spasmolytic and sedative effects.

EXAMPLE 3

Hypodermic solution

The solution was compounded from the following ingredients:

| | Parts |
|---|---|
| (—)-norscopolamine hydrochloride | 10.0 |
| Dextrose | 47.0 |
| Tartaric acid | 0.012 |
| Distilled water, q.s. ad by vol. | 2.0 |

Compounding procedure

The norscopolamine salt, the dextrose and the tartaric acid were dissolved in freshly distilled water, the solution was filtered until free from suspended particles, and the filtrate was filled into 2 cc.-ampules under aseptic conditions. The filled ampules were sealed and sterilized for 20 minutes at 120° C. Each ampule contained 10 mgm. of the norscopolamine salt, and when the contents thereof were administered by intramuscular injection to an experimental animal of about 60 kg. body weight in need of such treatment, very good spasmolytic and sedative effects were obtained.

Analogous results were obtained when an equal amount of (—)-norscopolamine or another non-toxic salt thereof was substituted for the particular (—)-norscopolamine salt in Examples 2 and 3. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof it will be readily apparent to other skilled in the art that the invention is not limited to these particular embodiments, and that various changes and modifications may be made without departing from the spirit of the invention.

We claim:

1. The method of preparing (—)-norscopolamine which comprises subjecting (—)-scopolamine or an acid addition salt thereof to oxidative demethylation with a permanganate in aqueous solution at a pH between about 6 and 9 and at a temperature between 0 and 60° C., and recovering the reaction product.

2. The method of preparing (—)-norscopolamine which comprises subjecting (—)-scopolamine or an acid addition salt thereof to oxidative demethylation with potassium permanganate in aqueous solution at a pH between about 6 and 7.5 and at a temperature between about 20 and 40° C., and recovering the reaction product.

3. The method of preparing (—)-norscopolamine which comprises subjecting (—)-scopolamine hydrobromide to oxidative demethylation with potassium permanganate in aqueous solution at a pH of about 7 and at a temperature of about 30° C., and recovering the reaction product.

References Cited

UNITED STATES PATENTS 3,472,861   10/1969   Zeile et al. _____ 260—292

OTHER REFERENCES

Schmidt et al., Liebigs Annalen, vol. 688, pp. 228–232 (1965).

ALAN L. ROTMAN, Primary Examiner

U.S. Cl. X.R.

260—256; 424—265